United States Patent
Dagci et al.

(10) Patent No.: US 7,735,478 B1
(45) Date of Patent: Jun. 15, 2010

(54) METHOD OF CALCULATING MASS FRACTION BURNT IN AN INTERNAL COMBUSTION ENGINE BASED ON RASSWEILER-WITHROW METHOD FOR REAL-TIME APPLICATIONS

(75) Inventors: Oguz H. Dagci, Sterling Heights, MI (US); Kenneth J. Buslepp, Brighton, MI (US)

(73) Assignee: GM Global Technology Operations, Inc.

( * ) Notice: Subject to any disclaimer, the term of this patent is extended or adjusted under 35 U.S.C. 154(b) by 0 days.

(21) Appl. No.: 12/276,915

(22) Filed: Nov. 24, 2008

(51) Int. Cl.
*F02D 41/00* (2006.01)
*F02M 7/28* (2006.01)

(52) U.S. Cl. ..................... 123/676; 123/435

(58) Field of Classification Search ............... 701/103, 701/108; 123/435–436, 676, 568.11; 60/285
See application file for complete search history.

(56) References Cited

U.S. PATENT DOCUMENTS

| | | | |
|---|---|---|---|
| 6,089,077 A * | 7/2000 | Daniels | 73/35.08 |
| 6,491,024 B1 * | 12/2002 | Connolly et al. | 123/406.19 |
| 6,805,099 B2 * | 10/2004 | Malaczynski et al. | 123/435 |
| 7,398,649 B2 * | 7/2008 | Bauer et al. | 60/605.2 |
| 2004/0144082 A1 * | 7/2004 | Mianzo et al. | 60/285 |
| 2005/0039721 A1 * | 2/2005 | Truscott et al. | 123/406.22 |
| 2007/0265805 A1 * | 11/2007 | Lee et al. | 702/187 |
| 2009/0182485 A1 * | 7/2009 | Loeffler et al. | 701/103 |

\* cited by examiner

*Primary Examiner*—Hai H Huynh

(57) ABSTRACT

A system and method for determining mass fraction burned in an internal combustion engine includes a plurality of engine sensors and a control module determining a ratio of specific heat from a combination of one or more from the group of exhaust gas temperature, injected fuel quantity, air quantity inside a cylinder, mass air flow, air fuel ratio, manifold pressure and a residual gas amount determined from the plurality of engine sensors. The control module includes a mass fraction burned module determining a mass fraction burned in response to a cylinder volume, and the ratio of specific heat. The control module controls an engine parameter based on mass fraction burned.

20 Claims, 8 Drawing Sheets

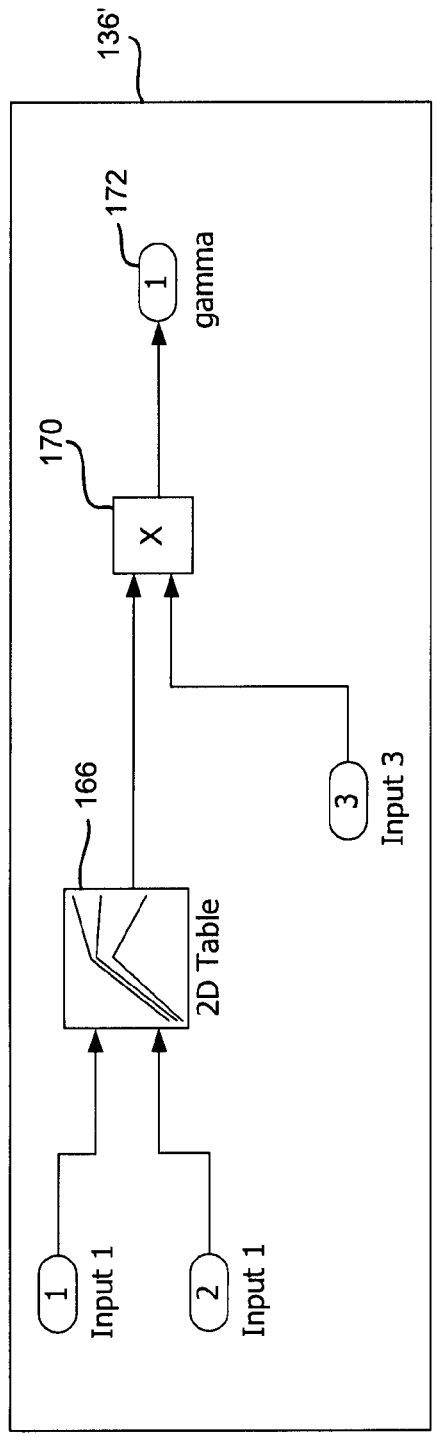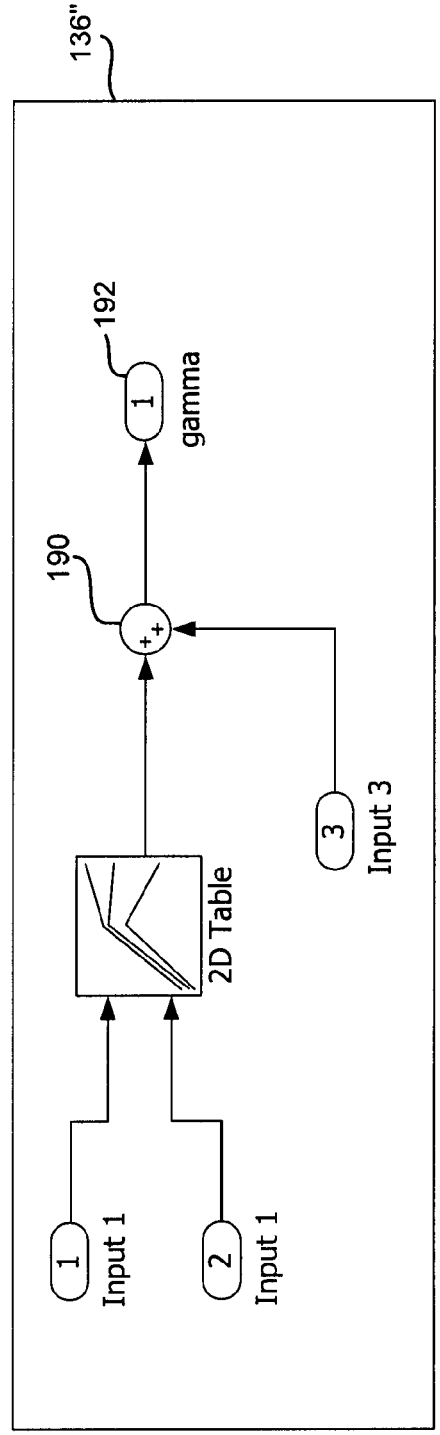
FIG. 8
FIG. 9

METHOD OF CALCULATING MASS FRACTION BURNT IN AN INTERNAL COMBUSTION ENGINE BASED ON RASSWEILER-WITHROW METHOD FOR REAL-TIME APPLICATIONS

FIELD

The present disclosure relates to vehicle control systems and more particularly to vehicle control systems for controlling an engine based on mass fraction burned.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The Calculation of the mass fraction burned for an internal combustion engine is an indicator of the rate that heat is release as the charge burns in a specific cylinder event. The results of this calculation can be used as an indication of combustion phasing, rate of heat release, charge dilution, or other metrics used in the control of an internal combustion engine. The determination of mass fraction burned may be used for controlling different engine functions. There are alternative methods to calculate mass fraction burned in an internal combustion engine. Those methods are either computationally complex or have insufficient accuracy for the engine control purposes. The Rassweiler-Withrow method is one of the most efficient equations, providing a very accurate representation of charge heat release. There are more accurate equations, but they are very computationally expensive. However, the formula involves an exponential term whose power is varying at each engine cycle. Since this exponential term should be calculated repeatedly throughout one engine cycle, it is a computationally expensive operation for real-time implementation.

SUMMARY

The present disclosure provides a method to simplify the mass fractioned burned calculation while staying in the required accuracy bounds for engine control operations.

In one aspect of the disclosure, a method includes determining a ratio of specific heat by determining a mixture temperature, air fuel ratio, and a representation of an amount of residual gasses in a cylinder from a combination of one or more from the group of exhaust gas temperature, injected fuel quantity, air quantity inside a cylinder, mass air flow, air fuel ratio, manifold pressure and a residual gas amount, determining a mass fraction burned in response to a cylinder volume, the mixture temperature, air fuel ratio and manifold pressure and the ratio of specific heat and controlling an engine parameter based on mass fraction burned.

In a further aspect of the disclosure, a method includes forming a table output from a two-dimensional table from two inputs selected from the group of exhaust gas temperature, injected fuel quantity, air quantity inside a cylinder, mass air flow, air fuel ratio, manifold pressure and a residual gas amount and a correction factor selected from the group not one of the two inputs selected to form the two dimensional table. The method further includes determining a mass fraction burned in response to a cylinder volume, the table output and the correction factor and controlling an engine parameter based on mass fraction burned.

In yet another aspect of the disclosure, a system includes a plurality of engine sensors and a control module determining a ratio of specific heat from a combination of one or more from the group of exhaust gas temperature, injected fuel quantity, air quantity inside a cylinder, mass air flow, air fuel ratio, manifold pressure and a residual gas amount determined from the plurality of engine sensors. The control module includes a mass fraction burned module determining a mass fraction burned in response to a cylinder volume, and the ratio of specific heat. The control module controls an engine parameter based on mass fraction burned.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 8 is a block diagrammatic view of a second embodiment of a gamma module.

FIG. 9 is a block diagrammatic view of a third embodiment of a gamma module.

DETAILED DESCRIPTION

Figure 1:
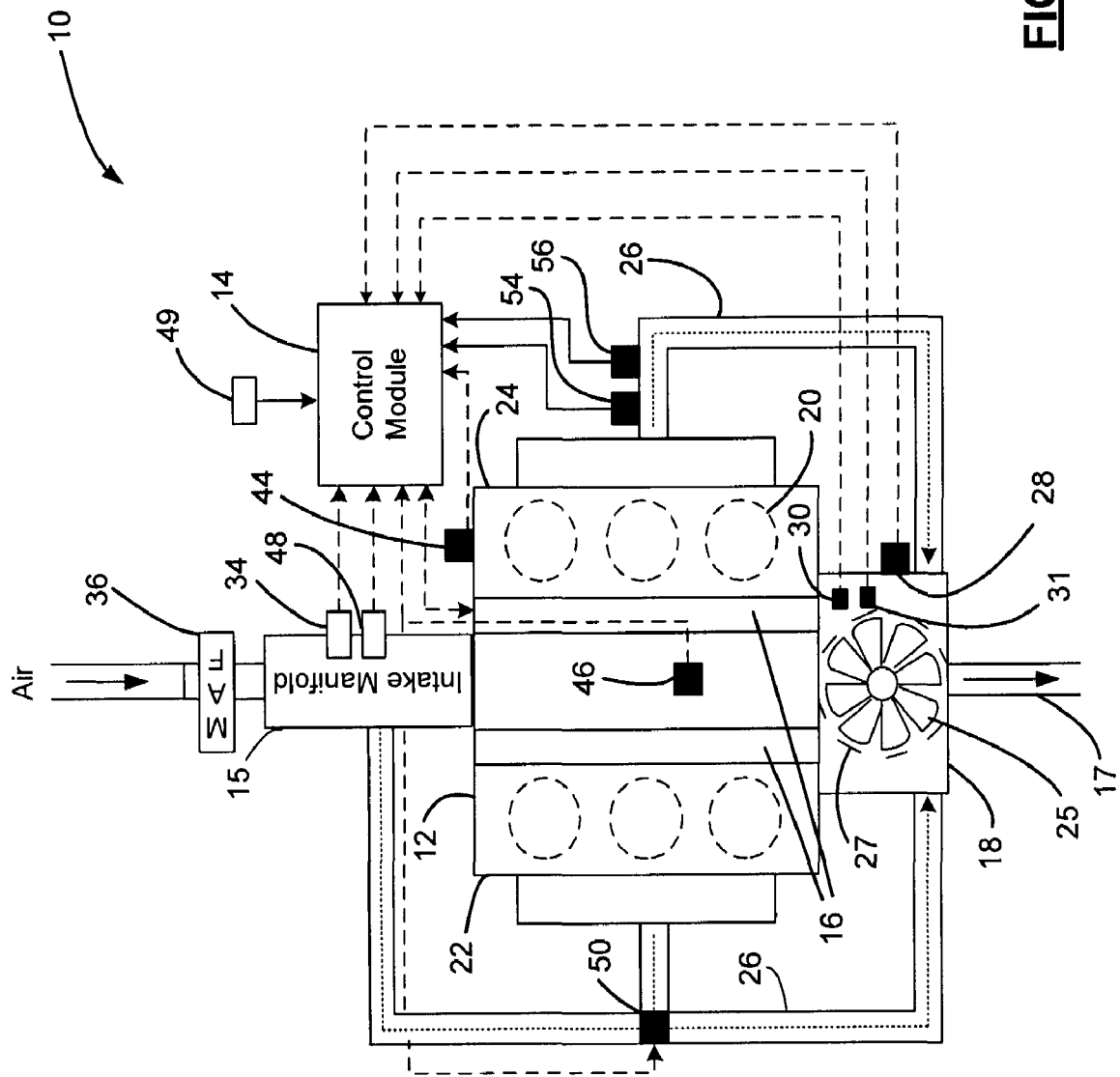
FIG. 1 is a block diagrammatic view of an engine control system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary engine control system 10 is schematically illustrated in accordance with the present disclosure. The engine control system 10 includes an engine 12 and a control module 14. The engine 12 can further include an intake manifold 15, a fuel injection system 16 having fuel injectors (not specifically shown), an exhaust system 17 and a turbocharger 18. The exemplary engine 12 includes six cylinders 20 configured in adjacent cylinder banks 22, 24 in a V-type layout. Although FIG. 1 depicts six cylinders (N=6), it can be appreciated that the engine 12 may include additional or fewer cylinders 20. For example, engines having 2, 4, 5, 8, 10, 12 and 16 cylinders are contemplated. It is also anticipated that the engine 12 can have an inline-type cylinder configuration. While an internal combustion engine utilizing sparkless and throttleless compression ignition such as a diesel engine is described, the present disclosure also applies to internal combustion engines utilizing spark ignition.

During engine operation, air is drawn into the intake manifold 15 by the inlet vacuum created by the engine intake stroke. Air is drawn into the individual cylinders 20 from the intake manifold 15 and is compressed therein. Fuel is injected by the injection system 16 and is mixed with air. In one example, the controller 14 can communicate with the injection system 16 to utilize pilot injection. For pilot injection a small amount of fuel is first injected into the cylinders 20 prior to the main charge in hope that the pilot charge will start to burn just before the main charge of fuel is injected, thus providing for prompt ignition of the main charge without significant delay. The air/fuel mixture is compressed and the heat of compression and/or electrical energy ignites the air/fuel mixture. Exhaust gas is exhausted from the cylinders 20 through exhaust conduits 26. The exhaust gas drives the turbine blades 25 of the turbocharger 18 which in turn drives compressor blades 25. The compressor blades 25 can deliver additional air (boost) to the intake manifold 15 and into the cylinders 20 for combustion.

The turbocharger 18 can be any suitable turbocharger such as, but not limited to, a variable nozzle turbocharger (VNT). The turbocharger 18 can include a plurality of variable position vanes 27 that regulate the amount of air delivered from the vehicle exhaust 17 to the engine 12 based on a signal from the control module 14. More specifically, the vanes 27 are movable between a fully-open position and a fully-closed position. When the vanes 27 are in the fully-closed position, the turbocharger 18 delivers a maximum amount of air into the intake manifold 15 and consequently into the engine 12. When the vanes 27 are in the fully-open position, the turbocharger 18 delivers a minimum amount of air into the engine 12. The amount of delivered air is regulated by selectively positioning the vanes 27 between the fully-open and fully-closed positions.

The turbocharger 18 includes an electronic control vane solenoid 28 that manipulates a flow of hydraulic fluid to a vane actuator (not shown). The vane actuator controls the position of the vanes 27. A vane position sensor 30 generates a vane position signal based on the physical position of the vanes 27. A boost sensor 31 generates a boost signal based on the additional air delivered to the intake manifold 15 by the turbocharger 18. While the turbocharger implemented herein is described as a VNT, it is contemplated that other turbochargers employing different electronic control methods may be employed.

A manifold absolute pressure (MAP) sensor 34 is located on the intake manifold 15 and provides a (MAP) signal based on the pressure in the intake manifold 15. A mass air flow (MAF) sensor 36 is located within an air inlet and provides a mass air flow (MAF) signal based on the mass of air flowing into the intake manifold 15. The control module 14 uses the MAF signal to determine the A/F ratio supplied to the engine 12. A crankshaft position sensor 44 provides a signal corresponding to the crankshaft opposition. The crankshaft position sensor 44 provides the control module 14 with a relative location of the crankshaft and the position of the pistons connected thereto. The crankshaft position sensor 44 also provide be used to derive an engine speed signal. An intake manifold temperature sensor 46 generates an intake air temperature signal. The control module 14 communicates an injector timing signal to the injection system 16. A vehicle speed sensor 49 generates a vehicle speed signal.

The exhaust conduits 26 can include an exhaust recirculation (EGR) valve 50. The EGR valve 50 can recirculate a portion of the exhaust gas. The controller 14 can control the EGR valve 50 to achieve a desired EGR rate.

The control module 14 controls overall operation of the engine system 10. More specifically, the control module 14 controls engine system operation based on various parameters including, but not limited to, driver input, stability control and the like. The control module 14 can be provided as an Engine Control Module (ECM).

The control module 14 can also regulate operation of the turbocharger 18 by regulating current to the vane solenoid 28. The control module 14 according to an embodiment of the present disclosure can communicate with the vane solenoid 28 to provide an increased flow of air (boost) into the intake manifold 15.

An exhaust gas temperature sensor 54 may provide a signal corresponding to the temperature of the exhaust gas. The exhaust gas temperature signal may be communicated to the control module 14. An exhaust gas sensor 56 may provide a signal corresponding to an amount or composition and amount of an exhaust gas or gases within the exhaust manifold 26. One example of a suitable exhaust gas component signal is an exhaust gas oxygen sensor. Of course, other types of gases such as carbon monoxide, carbon dioxide, oxides of nitrogen and hydrocarbons may all be measured.

The present disclosure provides an approximation of the well known Rassweiler-Withrow method to determine mass fraction burned in the engine during a complete cycle. The Rassweiler-Withrow method is:

$$\text{Mass Fraction Burned per Cycle} = \sum_{i=L}^{U} P(\theta_i) - \sum_{i=L}^{U} \left( P(\theta_{i-1}) \cdot \left( \frac{V(\theta_{i-1})}{V(\theta_i)} \right)^{\gamma} \right) \quad (1)$$

where P is the cylinder pressure and V is the cylinder volume that changes with the angular position of the crankshaft and the pistons therein.

In the formula above, $\gamma$ is not fixed. Therefore, the exponential term is calculated (U−L+1) times throughout one cycle in order to find mass fraction burned per cycle. However, that exponential calculation with the fractional powers is expensive in terms of computational complexity.

Figure 2:
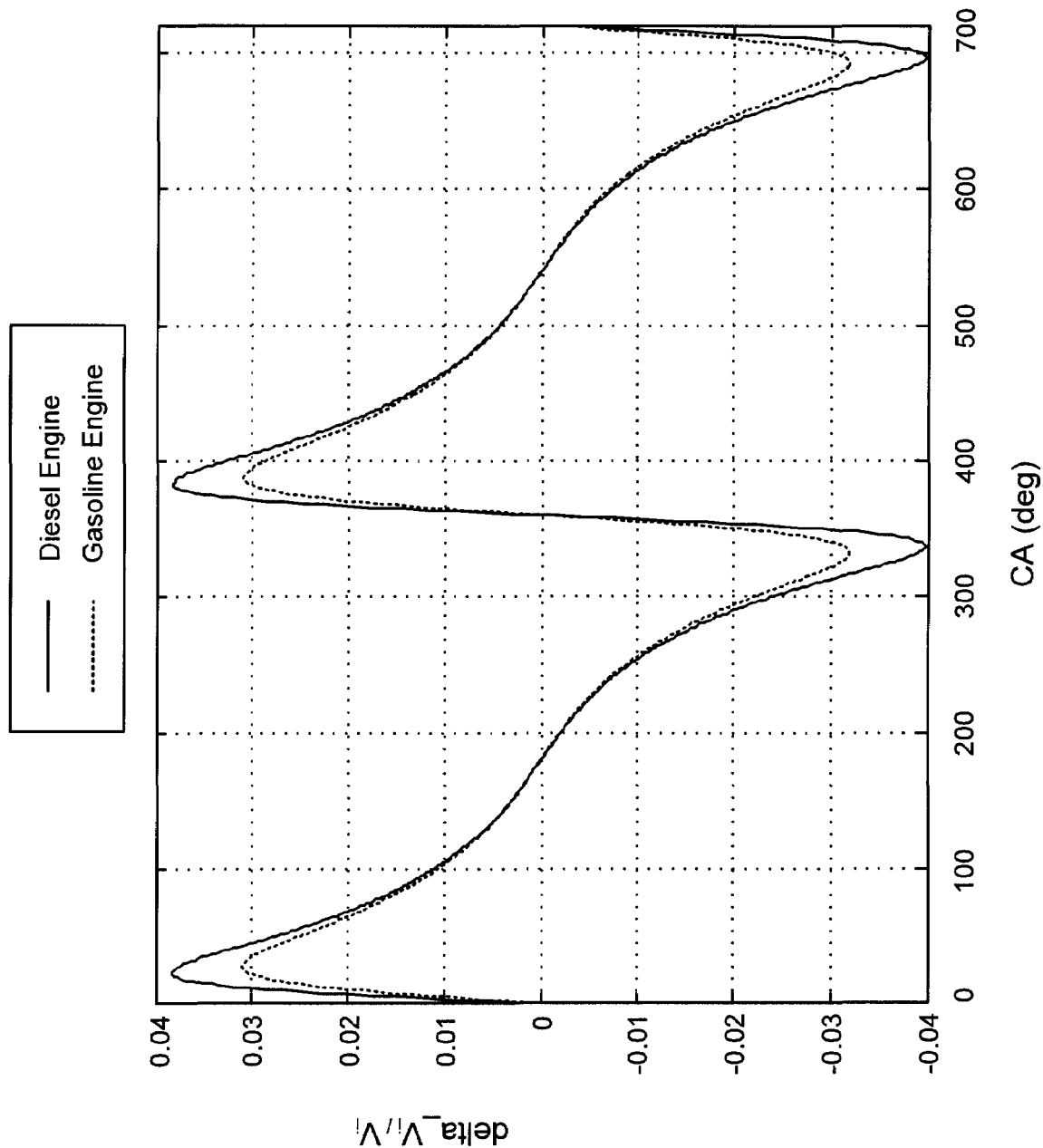
FIG. 2 is a plot of crank angle versus a change in volume over volume at particular intervals.

The following simplification has been realized without losing the accuracy of overall algorithm:

The variable $\Delta V$ is defined as $\Delta V(\theta_i) = V(\theta_i) - V(\theta_{i-1})$. FIG. 2 illustrates $$\left( \frac{V(\theta_{i-1})}{V(\theta_i)} \right) = \left( \frac{V(\theta_i) - \Delta V(\theta_i)}{V(\theta_i)} \right) = \left( 1 - \frac{\Delta V(\theta_i)}{V(\theta_i)} \right) \quad (2)$$

when $$\frac{\Delta V(\theta_i)}{V(\theta_i)}$$

with 1 degree crank angle deg increments is plotted for typical gasoline and diesel engines.

As seen in FIG. 2, $$\left|\frac{\Delta V(\theta_i)}{V(\theta_i)}\right|$$

can never be more than 1 when the volume is calculated with 1 degree crank angle intervals.

A Taylor series expansion for efficiently performing the mass fraction burned is set forth. Generally, a Taylor series of $(1+x)^m$ is as follows:

$$(1+x)^m = \sum_{n=0}^{\infty} \binom{m}{n} x^n = 1 + m \cdot x + \frac{m \cdot (m-1)}{2} \cdot x^2 + \ldots \text{ for all } |x| < 1 \quad (3)$$

Based on the formula above, x in the mass fraction burned case is $$-\frac{\Delta V(\theta_i)}{V(\theta_i)}$$

and m is γ.

$$\left(1 + \left(-\frac{\Delta V(\theta_i)}{V(\theta_i)}\right)\right)^{\gamma} = \sum_{n=0}^{\infty} \binom{\gamma}{n}\left(-\frac{\Delta V(\theta_i)}{V(\theta_i)}\right)^n = 1 - \gamma \cdot \frac{\Delta V(\theta_i)}{V(\theta_i)} + \frac{\gamma \cdot (\gamma-1)}{2} \cdot \left(\frac{\Delta V(\theta_i)}{V(\theta_i)}\right)^2 + \ldots \quad (4)$$

An approximation of the exponential term is determined by truncating the series at its second or third term as shown in Equation 5 and Equation 6.

$$\left(1 + \left(-\frac{\Delta V(\theta_i)}{V(\theta_i)}\right)\right)^{\gamma} \approx 1 - \gamma \cdot \frac{\Delta V(\theta_i)}{V(\theta_i)} \text{ or} \quad (5)$$

$$\left(1 + \left(-\frac{\Delta V(\theta_i)}{V(\theta_i)}\right)\right)^{\gamma} \approx 1 - \gamma \cdot \frac{\Delta V(\theta_i)}{V(\theta_i)} + \frac{\gamma \cdot (\gamma-1)}{2} \cdot \left(\frac{\Delta V(\theta_i)}{V(\theta_i)}\right)^2 \quad (6)$$

Figure 3:
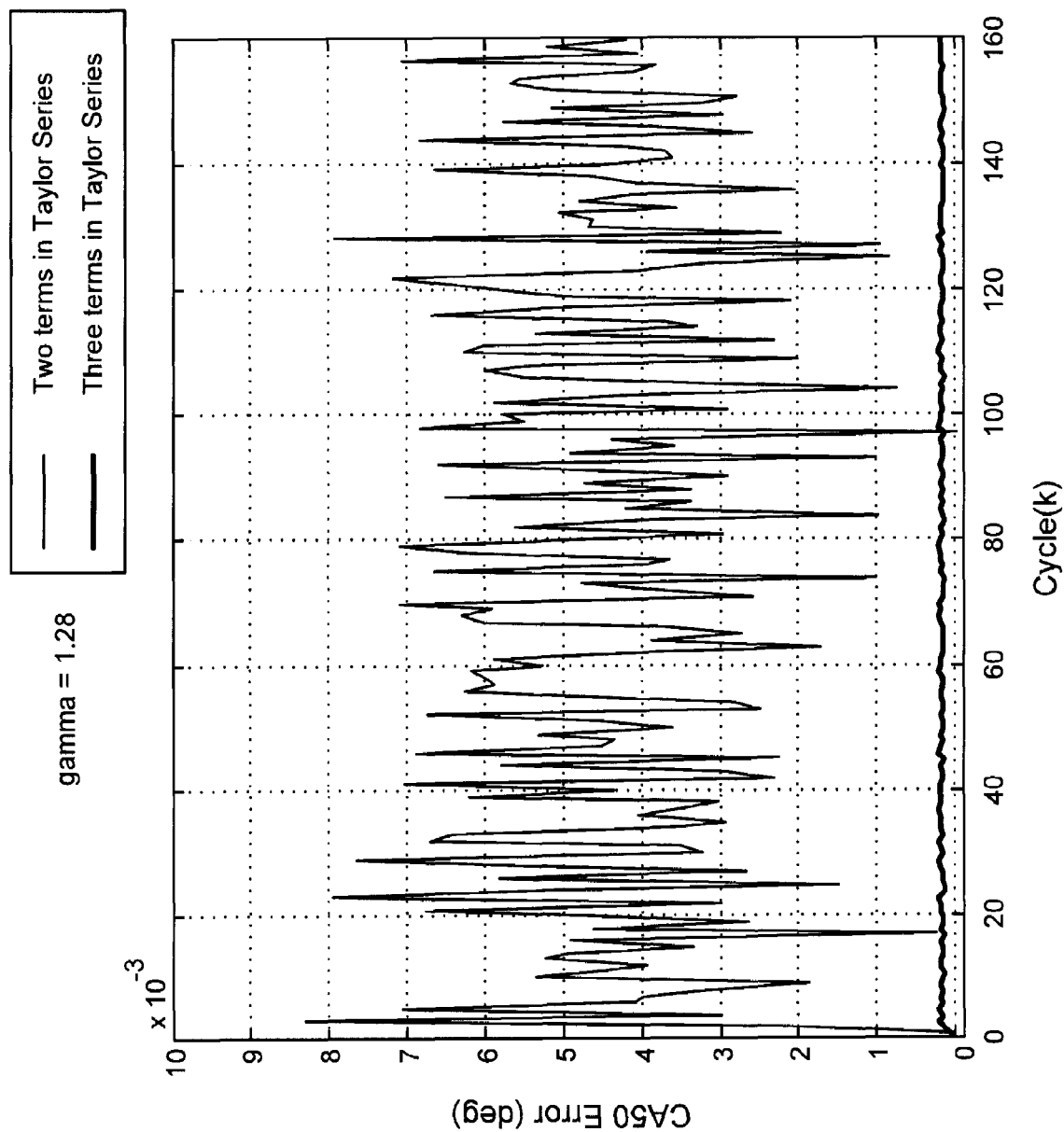
FIG. 3 is a plot of crank angle (CA50) error versus cycle using a two-term or three-term Taylor series expansion.

Referring now to FIG. 3, errors in crank angle 50% burned (CA50) calculation when Equation 5 and Equation 6 are used in Rassweiler-Withrow formula in Equation 1. In FIG. 3, accuracy is better as expected when Equation 6 is used due to the one additional term (two-term Taylor expansion versus three-term Taylor expansion). However, the use of either Equation 5 or 6 may be used depending on the desired computational efficiency and accuracy. If computational power is restricted, Equation 5 may be used. If there is some room for an extra multiplication and subtraction, then Equation 6 may be used for better accuracy.

Figure 4:
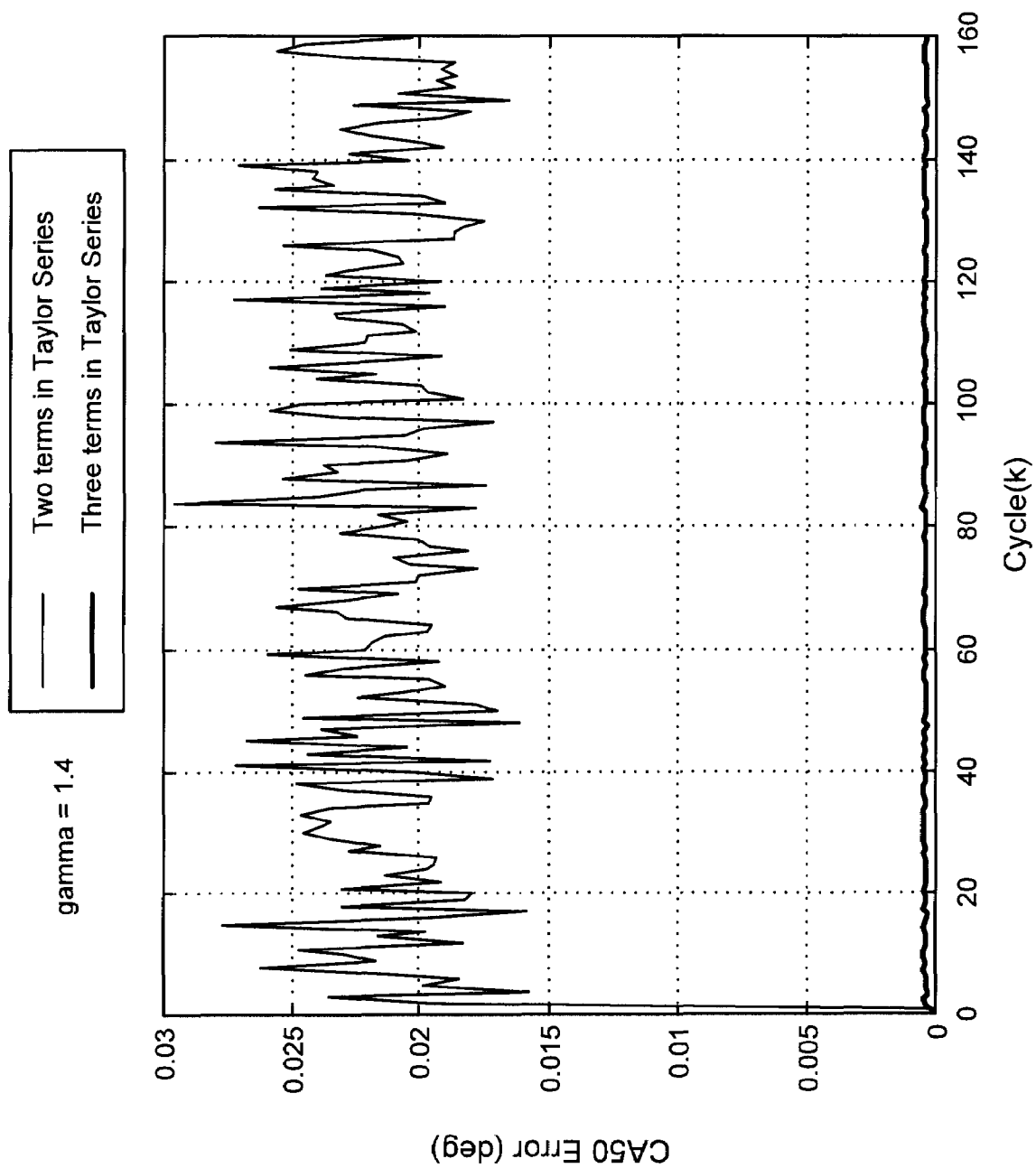
FIG. 4 is a plot of crank angle (CA50) error of an approximation of the exponential term in the Rassweiler-Withrow method.

FIG. 4 shows the CA50 error introduced by the disclosed method when γ takes its maximum value.

Figure 5:
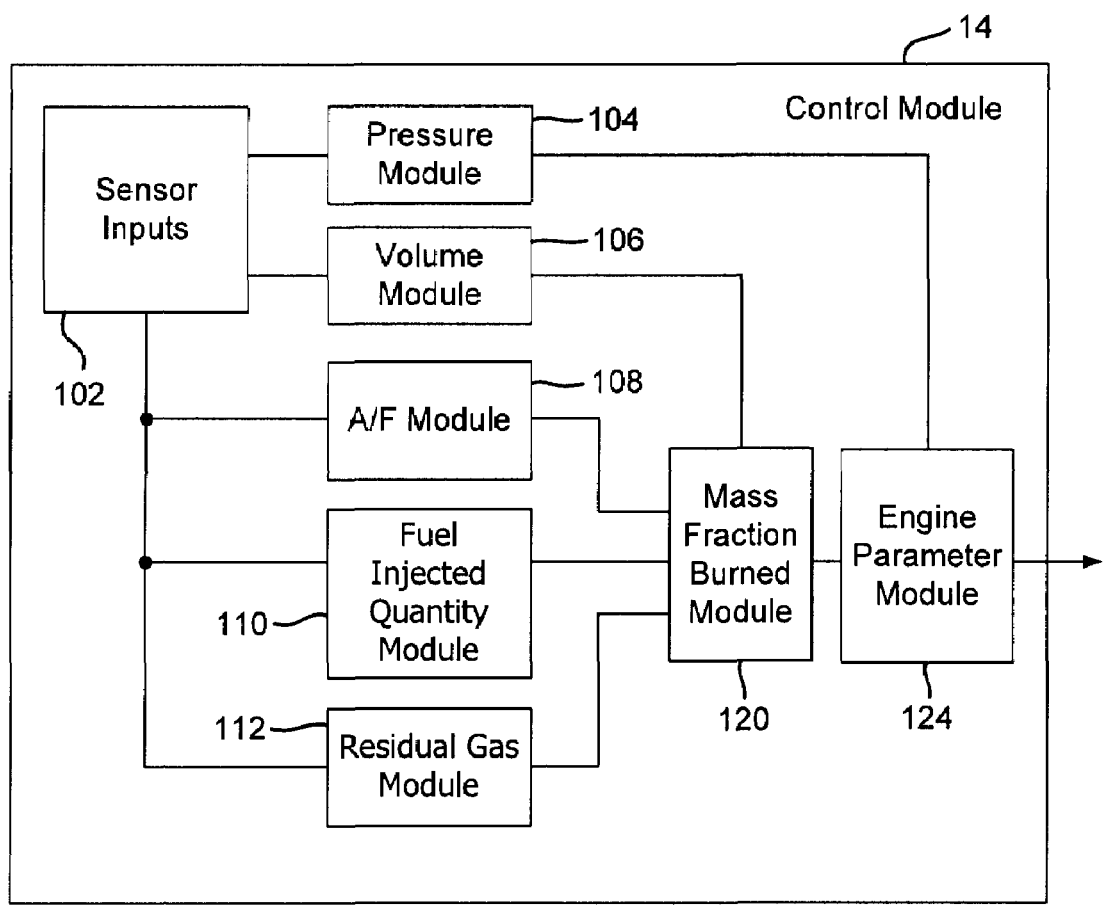
FIG. 5 is a detailed block diagrammatic view of the control module of FIG. 1.

Referring now to FIG. 5, a simplified block diagrammatic view of the control module 14 is illustrated. As mentioned above, there may be numerous sensors in communication with the control module 14. For simplicity, the sensor inputs 102 are illustrated as a single box. The sensor inputs 102 are used for determining various intermediate values. The sensor inputs 102 are provided to a pressure module 104, a volume module 106, an air fuel module 108, a fuel injected quantity module 110 and a residual gas module 112. The intermediate values determined within modules 104-112 are communicated to a mass fraction burned module 120. The mass fraction burned module 120 may provide a mass fraction burned for one complete cycle of the engine. An engine parameter module 124 receives the mass fraction burned signal from the mass fraction burned module 120 and controls an engine parameter in response thereto. The engine parameter module 124 may control various control functions including dilution control of the intake air. Dilution control may take place by opening the exhaust gas recirculation valve 50 illustrated in FIG. 1 to recirculate exhaust gas into the intake manifold 15. The mass fraction burned may also be used to estimate the torque delivered by a specific event when used in conjunction with other variables.

The pressure module 104 determines the pressure within the cylinders. The pressure within the cylinders may be determined using the manifold absolute pressure sensor 34.

The volume module 106 determines the volume based upon the crank shaft position. The volume module 106 determines the volume at various locations during the cycle. The air fuel module 108 determines an air fuel ratio signal in response to various sensor inputs. For example, the exhaust gas oxygen sensor may provide an indication as to the air fuel ratio.

The fuel injected quantity module 110 may use various sensor inputs 102 for determining the fuel injected quantity. The fuel injected quantity may be determined from the size of the pulse width of the control signal of the fuel injector for the particular cylinder.

The residual gas module 112 may use various measurements for determining the residual gas within a cylinder. The residual gas module may use a carbon dioxide measurement, an oxide of nitrogen measurement, a hydrocarbon analysis of the exhaust gas using the exhaust gas sensor 56 illustrated in FIG. 1.

It should be noted that the specific calculations performed in modules 104 through 112 vary depending upon the engine type and the geometric configuration of the engine.

Figure 6:
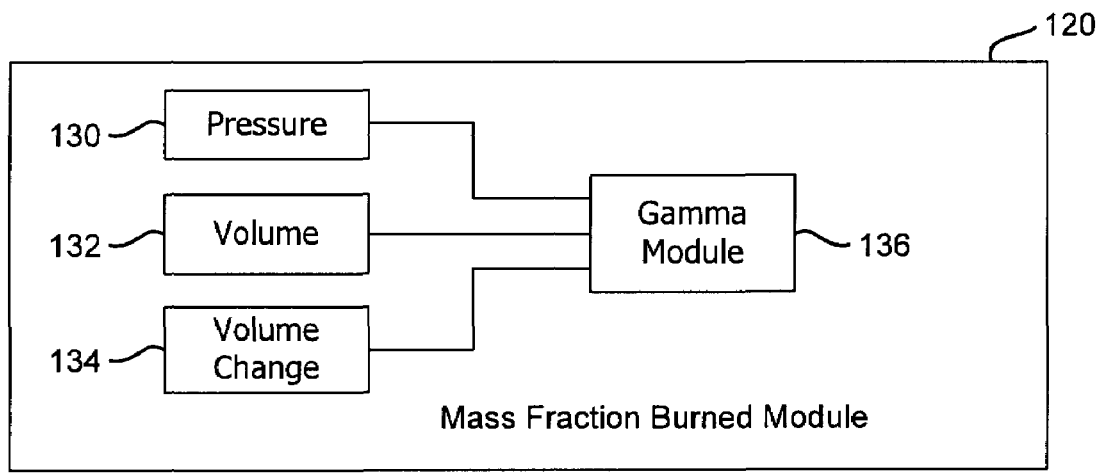
FIG. 6 is a detailed block diagrammatic view of the mass fraction burned module of FIG. 5.

Referring now to FIG. 6, a block diagrammatic view of the mass fraction burned module 120 is illustrated. The blocks in mass fraction burned module 120 correspond to the Rassweiler-Withrow formula of FIG. 1. A pressure of the cylinder is determined in block 130. A cylinder volume is determined in block 132. A volume change is determined in block 134. The volume change in block 134 represents the change in volume from one calculation to the next. The Gamma module 136 determines the gamma at the particular time for determining the mass fraction burned.

The determination of gamma (γ) is dependent on mixture temperature, air fuel ratio and the amount of residual gases inside the cylinder. Therefore, γ value is different not only at each cycle but also during each cycle before combustion and after combustion due to the chemical reactions inside the cylinder.

Two alternative methods, one with two variations, for finding γ are set forth.

Figure 7:
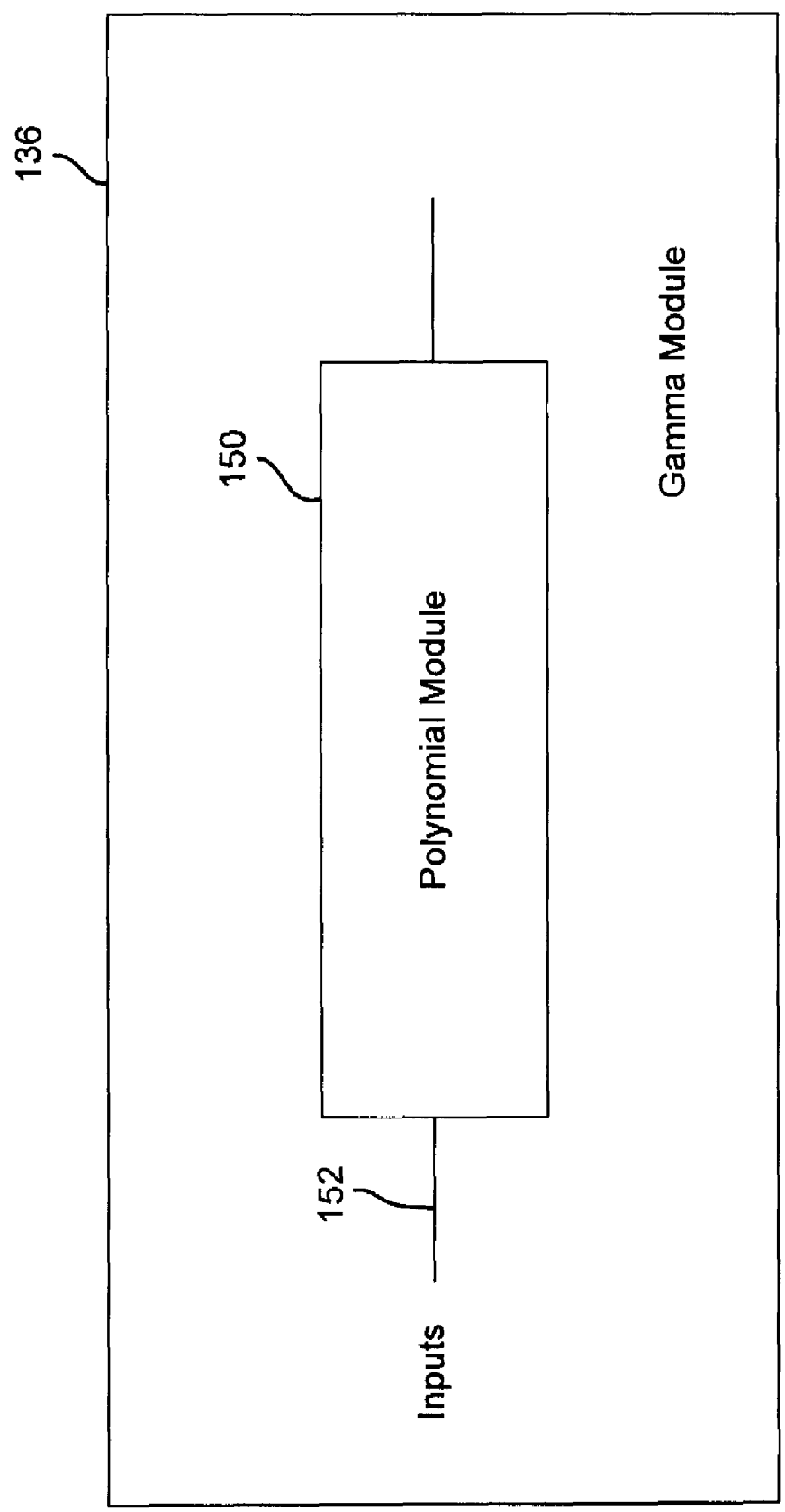
FIG. 7 is a detailed block diagrammatic view of a first embodiment of a gamma module.

Referring now to FIG. 7, the variable γ representing the ratio of specific heat can be calculated using a polynomial ($\gamma=f(x_1, x_2, x_3)$) in a polynomial block 150 of the gamma module 136. The inputs may be one or more of exhaust gas temperature, injected fuel quantity, air quantity inside the cylinder, mass air flow reading, air fuel ratio, manifold pressure and residual gas amount. In the polynomial, all these inputs are not needed. Ultimately, any combination of these measurements that represent mixture temperature, air fuel ratio and the amount of residual gases may yield γ.

Referring now to FIG. 8, another alternative method for calculating γ in the gamma module 136' is to use a two dimensional calibration table 66. In FIG. 8, Input1, Input2 and Input3 can be exhaust gas temperature, injected fuel quantity, air quantity inside the cylinder, mass air flow reading, air fuel ratio, manifold pressure and residual gas amount. Two of the above quantities may be used as inputs to the two dimensional table 166. Two input quantities may be used and a table output value determined therefrom. The table 166 may be determined experimentally by various calibration techniques including test track calibrations or engine dynamometer calibrations. Two of the variables may provide a table or plot for determining the table output. The table output and another or third input, Input3, is provided to a multiplication block 170. Input3 may be one of the three variables exhaust gas temperature, injected fuel quantity, air quantity inside the cylinder, mass airflow reading, air fuel ratio, manifold pressure and residual gas amount. The value chosen for Input3 should not be the same value used as one of the first two inputs for the input table. The Input3 may also be multiplied by a particular factor or other constant. Ultimately, the output of the table 166 and Input3 are multiplied together in the multiplication block 170 to form gamma 172.

Referring now to FIG. 9, a similar embodiment to that illustrated in FIG. 8 is illustrated except that the output of the two dimensional table 166 and the Input3 is provided to an additive block 190 rather than a multiplicative block 170.

Figure 10:
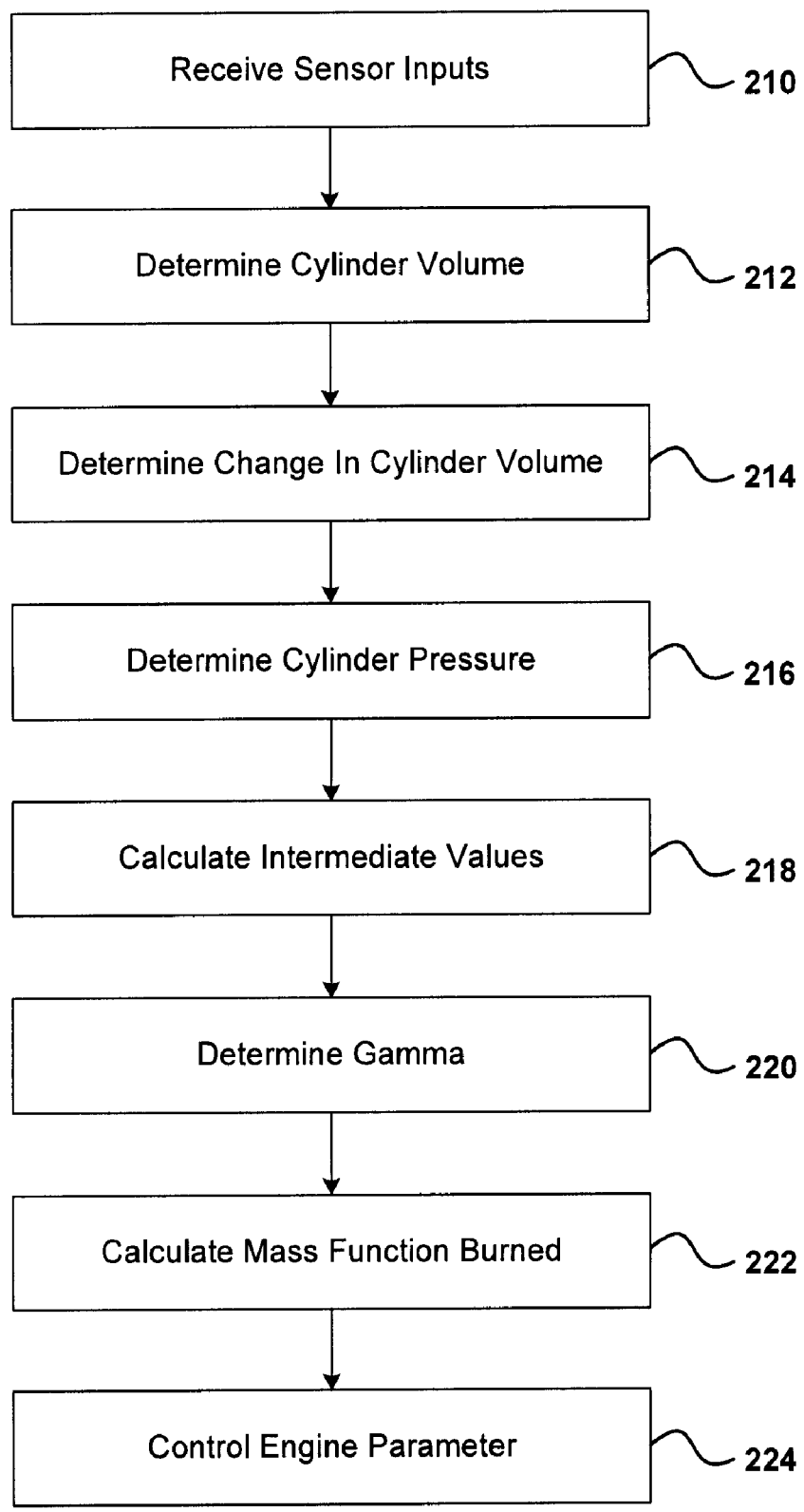
FIG. 10 is a flowchart of a method for determining mass fraction burned and controlling an engine parameter in response thereto.

Referring now to FIG. 10, a summary of the method for determining mass fraction burned is set forth. In step 210, the various sensor inputs are received. As mentioned above, various sensor inputs may be provided from FIG. 1. In step 212, a cylinder volume may be calculated or stored within the control module. The cylinder volume at various crank shaft angles may be determined using geometric calculations.

In step 214, a change in the cylinder volume from the previous crank shaft position may be determined also using geographic determination. A cylinder pressure may be determined in step 216. As mentioned above, the cylinder pressure may be determined using the input manifold pressure or other terms. In step 218, other intermediate values such as those illustrated in FIG. 5 may be determined. For example, the air fuel ratio, the fuel injected quantity and the residual gas may all be determined as described above. In step 220, gamma may be determined according to the methods described above in FIGS. 7 through 9. Once gamma has been determined, the mass fraction burned may be determined in step 222. The mass fraction burned uses the pressure and volume and gamma calculations above in the Rassweiler-Withrow method formula of FIG. 1 and the Taylor series expansion thereof. In step 224, an engine parameter such as the dilution or torque may be controlled in response to the mass fraction burned.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method of controlling an engine, the method comprising:
    determining a ratio of specific heat by determining a mixture temperature, air fuel ratio, and a representation of an amount of residual gasses in a cylinder from a combination of one or more from the group of exhaust gas temperature, injected fuel quantity, air quantity inside a cylinder, mass air flow, air fuel ratio, manifold pressure, and a residual gas amount;
    determining a mass fraction burned in response to a cylinder volume, the mixture temperature, air fuel ratio, manifold pressure, and the ratio of specific heat; and
    controlling engine parameters based on mass fraction burned.

2. A method as recited in claim 1 wherein determining a mixture temperature, air fuel ratio, and a representation of an amount of residual gasses comprises forming a polynomial in a polynomial block of a gamma module.

3. A method as recited in claim 1 wherein determining a mass fraction burned in response to a cylinder volume, the mixture temperature, air fuel ratio, manifold pressure, and the ratio of specific heat comprises determining a mass fraction burned in response to a cylinder volume, a change in cylinder volume, the mixture temperature, air fuel ratio, intake manifold pressure, and the ratio of specific heat.

4. A method as recited in claim 1 wherein determining a mass fraction burned in response to a cylinder volume, the mixture temperature, air fuel ratio, manifold pressure, and the ratio of specific heat comprises determining a mass fraction burned in response to a cylinder volume, a change in cylinder volume, the mixture temperature, air fuel ratio, a cylinder pressure, and the ratio of specific heat.

5. A method as recited in claim 1 wherein controlling an engine parameter comprises controlling dilution.

6. A method as recited in claim 5 wherein controlling dilution comprises controlling an exhaust gas recirculation valve.

7. A method as recited in claim 1 wherein determining a mass fraction burned comprises determining a mass fraction burned in response to a Taylor series expansion.

8. A method of controlling an engine comprising:
    forming a table output from a two-dimensional table from two inputs selected from the group of exhaust gas temperature, injected fuel quantity, air quantity inside a cylinder, mass air flow, air fuel ratio, manifold pressure, a residual gas amount, and a correction factor selected from the group not one of the two inputs selected to form the two-dimensional table;
    determining a mass fraction burned in response to a cylinder volume, the table output and the correction factor; and
    controlling engine parameters based on mass fraction burned.

9. A method as recited in claim 8 wherein determining a mass fraction burned in response to a cylinder volume, the table output and the correction factor comprises determining a mass fraction burned in response to a cylinder volume, a change in cylinder volume, the table output, and the correction factor.

10. A method as recited in claim 8 wherein determining a mass fraction burned comprises adding the table output and the correction factor together.

11. A method as recited in claim 8 wherein determining a mass fraction burned comprises multiplying the table output and the correction factor together.

12. A method as recited in claim 8 wherein controlling an engine parameter comprises controlling dilution.

13. A method as recited in claim 12 wherein controlling dilution comprises controlling an exhaust gas recirculation valve.

14. A method as recited in claim 8 wherein determining a mass fraction burned comprises determining a mass fraction burned in response to a Taylor series expansion.

15. A system comprising:
a plurality of engine sensors; and
a control module determining a ratio of specific heat from a combination of one or more from the group of exhaust gas temperature, injected fuel quantity, air quantity inside a cylinder, mass air flow, air fuel ratio, manifold pressure, and a residual gas amount determined from the plurality of engine sensors,
said control module comprising a mass fraction burned module determining a mass fraction burned in response to a cylinder volume, and the ratio of specific heat, said control module controlling an engine parameter based on mass fraction burned.

16. A system as recited in claim 15 wherein said control module comprising a two-dimensional table having a table output from two inputs selected from the group of exhaust gas temperature, injected fuel quantity, air quantity inside a cylinder, mass air flow, air fuel ratio, manifold pressure, and a residual gas amount, said control module forming a correction factor selected from the group not one of the two inputs selected from the group.

17. A method as recited in claim 16 wherein the control module determines the ratio of specific heat by adding the correction factor and the table output.

18. A method as recited in claim 16 wherein the control module determines the ratio of specific heat by multiplying the correction factor and the table output.

19. A method as recited in claim 16 wherein the control module forms a polynomial representative of mixture temperature, air fuel ratio, and an amount of residual gasses in a cylinder from the at least two from the group.

20. A method as recited in claim 16 wherein the controller controls dilution of input gasses.

* * * * *